H. ALEXANDER.
ALTERNATING CURRENT MOTOR.
APPLICATION FILED JULY 21, 1909.

953,018.

Patented Mar. 29, 1910.

Witnesses:
Irving E. Steers.
J. Ellis Eler

Inventor
Hans Alexander,
Att'y.

UNITED STATES PATENT OFFICE.

HANS ALEXANDER, OF BERLIN, GERMANY, ASSIGNOR TO GENERAL ELECTRIC COMPANY, A CORPORATION OF NEW YORK.

ALTERNATING-CURRENT MOTOR.

953,018.  Specification of Letters Patent.  Patented Mar. 29, 1910.

Application filed July 21, 1909. Serial No. 508,802.

*To all whom it may concern:*

Be it known that I, HANS ALEXANDER, a subject of the Emperor of Germany, residing at Berlin, Germany, have invented certain new and useful Improvements in Alternating-Current Motors, of which the following is a specification.

My invention relates to polyphase motors of the commutator type, and its object is to improve the efficiency of such motors.

The stator winding of polyphase motors, as ordinarily arranged, is composed of separate windings for the several phases, each distributed over a portion only of the stator. By the term "separate" I mean to distinguish this type of winding from a single closed winding with a polyphase arrangement of terminals. The winding with separate phases, each distributed over a portion only of the stator, produces a flat-topped field for each phase. When, with such a stator winding, the usual electrically diametrical arrangement of commutator brushes is employed, the distributions of stator and rotor magneto-motive forces are not the same,—the stator field being flat-topped and the rotor being peaked. This difference in distribution results in leakage fields which have an unfavorable influence upon the torque, power-factor, and commutation. By my invention such leakage fields are eliminated.

My invention consists in so arranging the commutator brushes and their connections that they form with the rotor winding polyphase circuits each of which comprises a set of rotor conductors lying opposite the conductors of one of the phases of the stator winding,—that is, the distribution of the conductors comprising each rotor circuit corresponds to the distribution of stator conductors in each phase of the stator winding, so that the magnetomotive forces of stator and rotor are of the same shape, and leakage fields are avoided.

Figure 1:
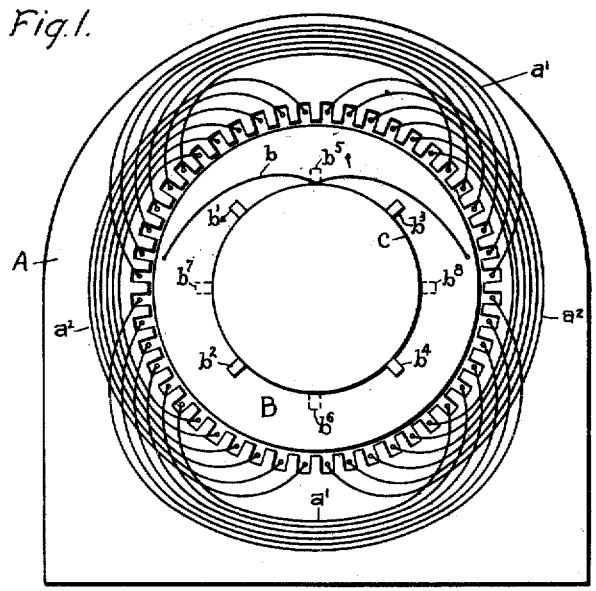
Figure 2:
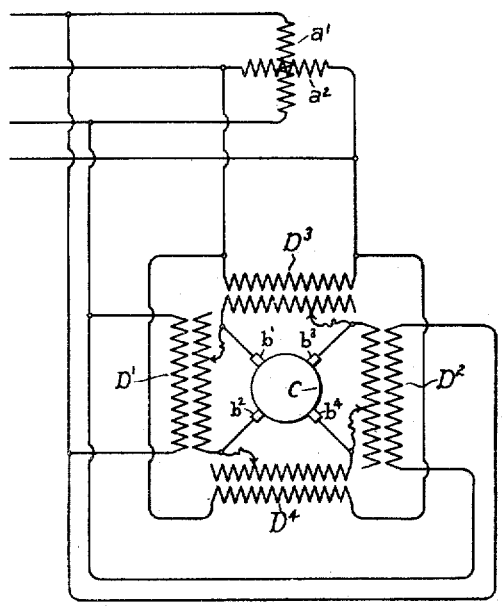

My invention will best be understood by reference to the accompanying drawing, Figure 1 of which shows diagrammatically a bipolar polyphase motor with the brushes arranged in accordance with my invention; Fig. 2 shows a suitable arrangement of circuit connections for the motor of Fig. 1; and Fig. 3 shows a modification of the rotor connections.

In Fig. 1, A represents the stator, which is shown provided with a two-phase winding. $a^1$ $a^1$ represent the coils of one phase, which are distributed over half the stator, while the coils $a^2$ $a^2$ of the other phase are distributed over the remaining portion of the stator. The coils $a^1$ produce a magnetization along a vertical line, and the coils $a^2$ along a horizontal line. It will be seen that the field produced by each set of coils is flat-topped. B represents the rotor and $b$ a rotor coil, the other coils being omitted to avoid confusing the diagram. C represents the commutator to which the rotor coils are connected. $b^1$ to $b^4$ represent the commutator brushes placed in accordance with my invention. $b^5$ to $b^8$ represent in dotted lines the usual positions of the brushes in such a motor,—that is, the brushes $b^5$ and $b^6$ are arranged diametrically opposite on the line of magnetization of the stator phase $a^1$, and brushes $b^7$ and $b^8$ diametrically opposite on the line of magnetization of the stator phase $a^2$. It will be seen that with this usual arrangement of brushes indicated by the dotted lines, the rotor fields are peaked, and consequently do not correspond in shape to the stator fields. If, however, the brushes are arranged as shown in full lines at $b^1$ to $b^4$, and circuits for one phase formed to include the conductors between brushes $b^1$ and $b^2$, and the conductors between brushes $b^3$ and $b^4$, the rotor conductors included in this phase will lie opposite the conductors in the stator phase $a^1$, and a flat-topped field will be produced of the same shape as that produced by the coils $a^1$. Similarly the portions of the rotor between brushes $b^1$ and $b^3$, and between brushes $b^2$ and $b^4$ comprise the circuits for the other phase.

If a variable voltage is to be impressed on the rotor for speed control, the circuit arrangement may be as shown in Fig. 2. Two transformers $D^1$ and $D^2$ have their primaries connected in parallel with the stator phase $a^1$, and their secondaries connected across brushes $b^1$ and $b^2$, and brushes $b^3$ and $b^4$, respectively. The transformers $D^3$ and $D^4$ are similarly connected for the other phase. The number of turns of the transformer secondaries is indicated as variable, so that the voltage impressed on the rotor circuits may be varied to control the motor speed.

Figure 3:
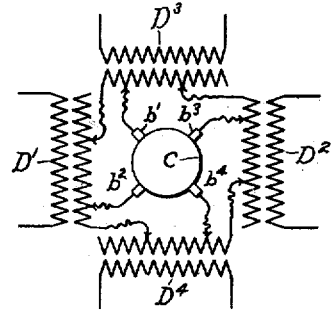

If it is desired to vary the phase, as well as the amount, of the rotor impressed voltage, in order to improve the power-factor, this may be accomplished by the arrangement shown in Fig. 3, in which the circuit between each pair of brushes includes portions of two transformer windings of different phase. Thus, for instance, the circuit between brushes $b^1$ and $b^2$, in addition to including a variable portion of the secondary of transformer $D^1$, includes a variable portion of the secondary of transformer $D^3$.

I do not desire to limit myself to the particular construction and arrangement of parts here shown, but aim in the appended claims to cover all modifications which are within the scope of my invention.

What I claim as new and desire to secure by Letters Patent of the United States, is,—

1. A polyphase motor of the commutator type comprising a polyphase stator winding, each phase comprising a separate winding distributed over a portion only of the stator, a rotor winding provided with a commutator, and commutator brushes and connections forming with portions of the rotor winding polyphase circuits, the brushes being so arranged that each rotor circuit comprises a set of rotor conductors lying opposite the conductors of one of the phases of the stator winding.

2. A polyphase motor of the commutator type comprising a polyphase stator winding, each phase comprising a separate winding distributed over a portion only of the stator, a rotor winding provided with a commutator, commutator brushes and connections forming with portions of the rotor winding polyphase circuits, the brushes being so arranged that each rotor circuit comprises a set of rotor conductors lying opposite the conductors of one of the phases of the stator winding, and sources of variable voltage included in the several rotor circuits.

3. A polyphase motor of the commutator type comprising a polyphase stator winding, each phase comprising a separate winding distributed over a portion only of the stator, a rotor winding provided with a commutator, commutator brushes and connections forming with portions of the rotor winding polyphase circuits, the brushes being so arranged that each rotor circuit comprises a set of rotor conductors lying opposite the conductors of one of the phases of the stator winding, and sources of voltage variable in amount and phase included in the several rotor circuits.

4. A polyphase motor of the commutator type comprising a polyphase stator winding, each phase comprising a separate winding distributed over a portion only of the stator, a rotor winding provided with a commutator, and commutator brushes and connections forming with the rotor winding polyphase circuits, the brushes being so arranged that each rotor circuit comprises a portion only of the rotor coils, which portion corresponds in amount and in position with the portion of the stator over which one phase of the stator winding is distributed.

5. A polyphase motor of the commutator type comprising a polyphase stator winding, each phase comprising a separate winding distributed over a portion only of the stator, a rotor winding provided with a commutator, commutator brushes and connections forming with the rotor winding polyphase circuits, the brushes being so arranged that each rotor circuit comprises a portion only of the rotor coils, which portion corresponds in amount and in position with the portion of the stator over which one phase of the stator winding is distributed, and separate transformer windings of variable numbers of turns included in the several rotor circuits.

In witness whereof, I have hereunto set my hand this 12 June, 1909.

HANS ALEXANDER.

Witnesses:
RICHARD T. DUNAN,
JOSEPH D. GRIFFIN.